(12) United States Patent
Ando

(10) Patent No.: US 11,042,149 B2
(45) Date of Patent: Jun. 22, 2021

(54) MONITORING DEVICES, MONITORED CONTROL SYSTEMS AND METHODS FOR PROGRAMMING SUCH DEVICES AND SYSTEMS

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 78 days.

(21) Appl. No.: 16/479,944

(22) PCT Filed: Mar. 1, 2017

(86) PCT No.: PCT/IB2017/000187
§ 371 (c)(1),
(2) Date: Jul. 23, 2019

(87) PCT Pub. No.: WO2018/158601
PCT Pub. Date: Sep. 7, 2018

(65) Prior Publication Data
US 2019/0339679 A1    Nov. 7, 2019

(51) Int. Cl.
*G05B 23/02* (2006.01)
*G05B 13/02* (2006.01)
(Continued)

(52) U.S. Cl.
CPC ..... *G05B 23/0208* (2013.01); *G05B 13/0265* (2013.01); *G06K 9/00664* (2013.01); *G06N 20/00* (2019.01); *G06K 2209/19* (2013.01)

(58) Field of Classification Search
CPC ............ G05B 23/0208; G05B 13/0265; G05B 2219/37555; G05B 19/4184;
(Continued)

(56) References Cited

U.S. PATENT DOCUMENTS

2012/0053728 A1  3/2012  Theodorus et al.
2013/0151007 A1  6/2013  Valpola et al.
(Continued)

FOREIGN PATENT DOCUMENTS

EP    2474495 A1   7/2012
EP    3070547 A2   9/2016
(Continued)

OTHER PUBLICATIONS

The European Office Action (EPOA) dated Oct. 9, 2020 in a counterpart European patent application.
(Continued)

*Primary Examiner* — Charles R Kasenge
(74) *Attorney, Agent, or Firm* — Metrolex IP Law Group, PLLC

(57) ABSTRACT

Monitored control system includes an action device and a monitoring device for monitoring the operation of the action device. The action device includes actuator modules, a sensor module and a control module to command the actuator modules to perform a predefined task using the sensor data. The monitoring device receive monitored data from the action device and compute an action device operation indicator indicative of a correct or abnormal operation of the action device on the basis of the monitored data. The action device operation indicator is computed on the basis of a learned value of an adjustable monitoring parameter. The learned value is determined from a set of labelled data generated from trial datasets recorded by the action device during an iterative learning procedure.

12 Claims, 2 Drawing Sheets

(51) Int. Cl.
*G06K 9/00* (2006.01)
*G06N 20/00* (2019.01)

(58) Field of Classification Search
CPC .......... G05B 19/4183; G05B 19/41845; G05B 2219/31483; G05B 2219/40053; G06N 20/00; G06K 9/00664; G06K 2209/19; Y02P 90/02; B25J 9/1674; B25J 9/163
See application file for complete search history.

(56) References Cited

U.S. PATENT DOCUMENTS

| | | | | |
|---|---|---|---|---|
| 2015/0290795 | A1* | 10/2015 | Oleynik | B25J 9/0081 700/257 |
| 2016/0059412 | A1* | 3/2016 | Oleynik | B25J 3/04 700/257 |
| 2016/0116378 | A1 | 4/2016 | Bates et al. | |
| 2016/0297068 | A1 | 10/2016 | Thibodeau et al. | |
| 2018/0082217 | A1 | 3/2018 | Bates et al. | |

FOREIGN PATENT DOCUMENTS

| | | |
|---|---|---|
| JP | 5289574 B2 | 9/2013 |
| WO | 2010/122445 A1 | 10/2010 |
| WO | 2011/161304 A1 | 12/2011 |
| WO | 2016/033247 A2 | 3/2016 |
| WO | 2016/164326 A1 | 10/2016 |

OTHER PUBLICATIONS

The International Search Report("ISR") of PCT/IB2017/000187 dated Nov. 7, 2017.
The Written Opinion("WO") of PCT/IB2017/000187 dated Nov. 7, 2017.

* cited by examiner

MONITORING DEVICES, MONITORED CONTROL SYSTEMS AND METHODS FOR PROGRAMMING SUCH DEVICES AND SYSTEMS

FIELD OF THE INVENTION

The instant invention relates to a monitored control system and a method for programming such a monitored control system.

The instant invention is related in particular to a monitored control system comprising an action device to perform a predefined task and a monitoring device to monitor an operation of the action device, wherein the action device perform said predefined task on the basis of a learned value of at least one adjustable control parameter.

BACKGROUND OF THE INVENTION

In particular, the instant invention is related to a monitored control system comprising an action device able to perform a predefined task and a monitoring device able to communicate with the action device and to monitor an operation of the action device.

As a matter of example, the action device can comprise a robotic arm and the predefined task performed by the action device may involve recognizing a workpiece, grasping and lifting the workpiece and moving the workpiece to a predetermined position.

The action device is provided with
a plurality of actuator modules commanded by a respective plurality of command signals,
at least one sensor to acquire sensor data, and
a control module able to receive the sensor data and to generate a plurality of command signals to command the actuator modules to perform a predefined task, said plurality of command signals being generated on the basis of the sensor data and a learned value of at least one adjustable control parameter.

The action device is a programmed device in which at least one adjustable control parameter is learned by machine learning.

The learned value of said at least one adjustable control parameter is determined by an iterative learning procedure wherein the action device perform a plurality of task trials with at least two different values of said at least one adjustable control parameter while recording an associated plurality of trial datasets, each trial dataset comprising at least command signals generated to command the actuator modules during a task trial and sensor data acquired by the sensor while the actuator modules are commanded.

Such a monitored control system is described above in the case of a monitored robotic arm but can be applied to many other fields.

Another example of field of application is the field of automated onboard systems such as air conditioning systems for cars.

In this case, the action device can comprise for instance an air conditioning system and the predefined task performed by the action device may involve controlling the temperature and/or humidity of the air inside a vehicle.

Air conditioning systems usually take advantage of some parts of the motor of the vehicle such as the car's radiator for instance and/or the power of the engine when it is turned on. As a consequence, the settings of the air conditioning system (temperature, flow, refrigeration cycle) can vary depending on the state of the engine and are difficult to predict and compute. It is such advantageous to learn the parameters by machine learning to optimise the operation of the air conditioning system.

Yet another example of field of application is the field of healthcare systems.

In this case, the action device can be for instance a blood pressure monitor, or sphygmomanometer, and the predefined task performed by the action device may involve measuring with high precision the blood pressure of an individual.

Such a device comprise an inflatable cuff able to collapse and then release an artery of the individual in a controlled manner while a manometer measure the pressure.

It is important to carefully control the air pressure in the cuff attached to the arm which can depend on the arm type of the individual. Thus, the amount of air sent to the cuff of the blood-pressure meter may be advantageously learned by machine learning.

In all these examples and field of application of the invention, the monitored control system also comprise a monitoring device able to communicate with the action device to receive monitored data from the action device.

The monitored data comprise at least one among the command signals and the sensor data.

The monitoring device is able to compute an action device operation indicator indicative of a correct or abnormal operation of the action device on the basis of said monitored data.

However, in the case of action devices with learned components, for instance the above examples of action devices where the value of at least one adjustable control parameter is not known a priori, it can be difficult to define and control a range of correct operation for the action device. As a consequence, it is also difficult to monitor the action device with a good accuracy.

Document JP 5289574 describes one example of a monitored control system in which the action device is an elevator control device and the adjustable control parameter is, in that case, a driving current. The precise car weight, inertia weight, and running resistance of the elevator can only be determined after the elevator has been installed and the driving current thus has to be adjusted after said installation. To this aim, a test is performed and the adjustable control parameter is adjusted by adding a predetermined corrected amount.

In this prior art, action device leaning is performed using a predetermined range set in advance. The monitoring device can thus take into account this range for computing the action device operation indicator.

However, when the update of the adjustable control parameter is performed by an iterative learning procedure such as a machine learning operation and in particular when the action device present several adjustable control parameters and several actuator modules, for instance when the action device is an action device that learned a complex operation, it is usually not possible to predict a useful range of learned value for the adjustable control parameter and the command signal of the actuator. As a consequence, it is often complicated for the monitoring module to evaluate whether the operation of the action device after learning operation is correct or abnormal.

The instant invention has notably for object to mitigate those drawbacks.

One goal of the invention is thus to provide a monitored action device having an action device with a control module with learned parameters and a monitoring device which can evaluate whether an operation of the action device is appropriate or not on the basis of command signals and/or sensor data from the action device.

SUMMARY OF THE INVENTION

To this aim, a first object of the invention is a monitoring device for monitoring an operation of an action device provided with a plurality of actuator modules respectively able to be commanded by a plurality of respective command signals, at least one sensor module able to acquire sensor data, a communication module, and a control module able to receive the sensor data and to generate a plurality of command signals to command the actuator modules to perform a predefined task, the monitoring device being provided with a communication module able to communicate with the communication module of the action device to receive monitored data from the action device, said monitored data comprising at least one among the command signals and the sensor data, and a control module able to compute an action device operation indicator indicative of a correct or abnormal operation of the action device on the basis of said monitored data.

The monitoring device computes the action device operation indicator on the basis of the monitored data and at least one learned value of at least one adjustable monitoring parameter, and in that said learned value of at least one adjustable monitoring parameter is determined on the basis of a set of labelled data generated at least in part from the plurality of trial datasets recorded by the action device during the iterative learning procedure.

In some embodiments, one might also use one or more of the following features:

the control module computes the action device operation indicator by mean of a classifier and said learned value of at least one adjustable monitoring parameter is a parameter of said classifier;

the monitoring device further comprises a monitoring device learning module able to receive a plurality of trial datasets and at least one test dataset from the action device, label the trial datasets with at least a first label and the at least one test dataset with at least a second label, and determine a learned value of at least one adjustable monitoring parameter of the control module of the monitoring device by training a classifier to classify respectively the trial datasets with the at least one first label and the test datasets with the at least one second label;

the monitoring device is operative to monitor an operation of an action device the plurality of command signals is generated on the basis of the sensor data and a learned value of at least one adjustable control parameter, said learned value of at least one adjustable control parameter being determined by an iterative learning procedure the action device perform a plurality of task trials with at least two different values of said at least one adjustable control parameter while recording an associated plurality of trial datasets, each trial dataset comprising at least command signals generated to command the actuator modules during a task trial and sensor data acquired by the sensor module while the actuator modules are commanded, and the set of labelled data is generated from the trial datasets of the action device recorded during the iterative learning procedure of the action device, and at least one test dataset recorded by setting the at least one adjustable control parameter of the action device to the learned value and commanding the action device to perform at least once the predefined task while recording said at least one test dataset.

Another object of the invention is a monitored control system comprising a monitoring device as detailed above, and an action device provided with a plurality of actuator modules respectively able to be commanded by a plurality of respective command signals, at least one sensor module able to acquire sensor data, a communication module, and a control module able to receive the sensor data and to generate a plurality of command signals to command the actuator modules to perform a predefined task.

In one embodiment, the sensor module of the action device comprises at least one input sensor able to acquire input sensor data that are used by the control module of the action device to generate the plurality of command signals, and at least one status sensor able to acquire status sensor data that are used by the control module of the monitoring device to computes the action device operation indicator.

In one embodiment, the input sensor is a bidimensional or tridimensional sensor such as a camera, and the status sensor is a lower dimensional sensor such as a vibration, noise, temperature, position, orientation or power sensor.

In one embodiment, the monitored control system further comprising an action device learning module, the action device learning module is able to command the control module of the action device to perform a plurality of predefined task trials with at least two different values of the at least one adjustable control parameter and at least one predefined task with a learned value of the at least one adjustable control parameter, respectively record a plurality of trial datasets and at least one test dataset, each trial dataset and test dataset comprising command signals generated to command the actuator modules during a respective predefined task trial and predefined task and sensor data acquired by the sensor module while the actuator modules are commanded, and determine said learned value of at least one adjustable control parameter of the control module of the action device by an iterative learning procedure on the basis of the plurality of trial datasets.

Yet another object of the invention is a method for programming a monitoring device as detailed above, the method comprising:

a monitoring device learning operation wherein a learned value of at least one adjustable monitoring parameter of the monitoring device is determined by labelling the trial datasets with at least a first label and the at least one test dataset with at least a second label, determining the learned value of at least one adjustable monitoring parameter by training a classifier to classify the trial datasets with the at least one first label and the test datasets with the at least one second label.

In one embodiment, the trial datasets are labelled with at least a first label and the at least one test dataset is labelled with at least a second label, and the learned value of the at least one adjustable monitoring parameter is determined by training a classifier to classify respectively the trial datasets with the at least one first label and the test datasets with the at least one second label.

Yet another object of the invention is a method for programming a monitored control system as detailed above, the method comprising:

an action device learning operation wherein a learned value of at least one adjustable control parameter of the control module of the action device is determined by an iterative learning procedure comprising commanding the action device to perform a plurality of predefined task trials with at least two different values of said at least one adjustable control parameter while recording an associated plurality of trial datasets, each trial dataset comprising command signals generated to command the actuator modules during a predefined task trial and sensor data acquired by the sensor module while the actuator modules are commanded, an action device test operation wherein at least one test dataset is recorded by setting said at least one adjustable control parameter to the learned value determined during the action device learning operation, and commanding the action device to perform at least once the predefined task while recording at least one associated test dataset, said at least one test dataset comprising command signals generated to command the actuator modules during said predefined task and sensor data acquired by the sensor module while the actuator modules are commanded, performing a method for programming a monitoring device according to claim 10 or 11.

In one embodiment, during the action device learning operation a learning level indicator is associated to each trial dataset and is indicative of a deviation of the task trial from the predefined task, and during the monitoring device learning operation the trial datasets are labelled with a plurality of first labels defined on the basis of the learning level indicator, and the learned value of said adjustable monitoring parameter is determined by training a classifier to classify respectively the trial datasets and the test datasets respectively with the plurality of first labels and the at least one second label.

In one embodiment, the predefined task comprises at least one target value of the sensor data, and the learning level associated to a trial dataset is function of a difference between a value of the sensor data at the end of the predefined task trial associated to said trial dataset and said target value of the sensor data, in particular the sensor module of the action device comprises at least one input sensor to acquire input sensor data, and at least one status sensor to acquire status sensor data, the control module of the action device generates the plurality of command signals on the basis of the input sensor data and the at least one adjustable control parameter, and the predefined task comprises at least one target value of the status sensor data.

In one embodiment, the action device learning operation involves a reinforcement learning and/or unsupervised learning algorithm, and the monitoring device learning operation involves a supervised learning algorithm.

Yet another object of the invention is a non-transitory computer readable storage medium, having stored thereon a computer program comprising program instructions, the computer program being loadable into a monitoring device learning module of a monitoring device as detailed above and adapted to cause said monitoring device learning module to carry out the steps of a method as detailed above when the computer program is run by the monitoring device learning module.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different Figures, the same reference signs designate like or similar elements.

DETAILED DESCRIPTION

Figure 1:
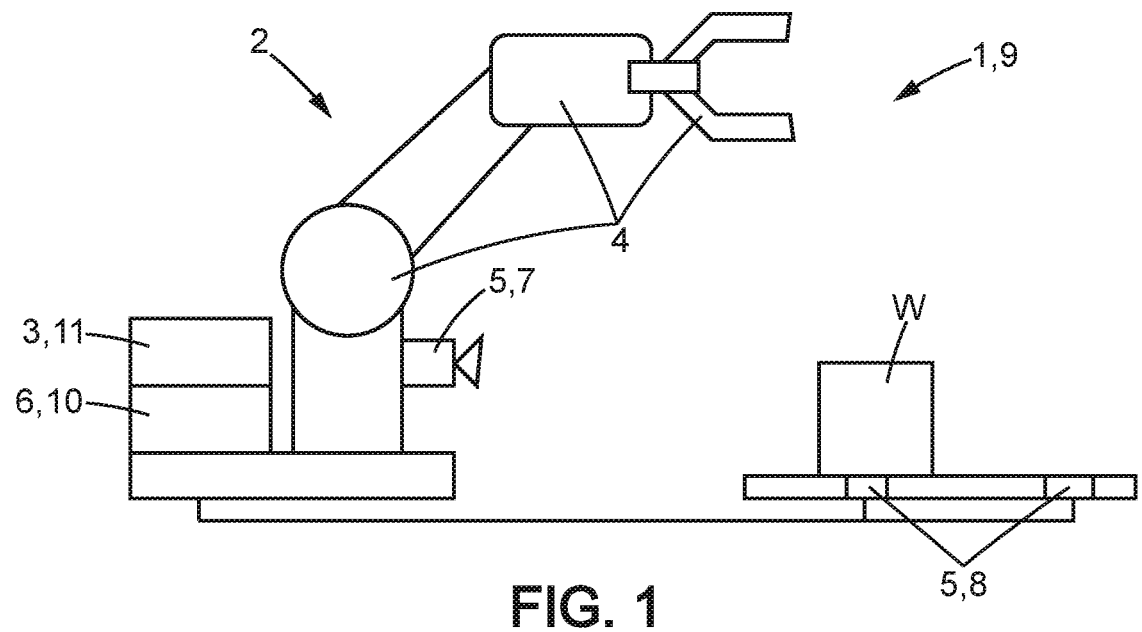
FIG. 1 illustrates a possible embodiment of a monitored control system according to the invention.
Figure 2:
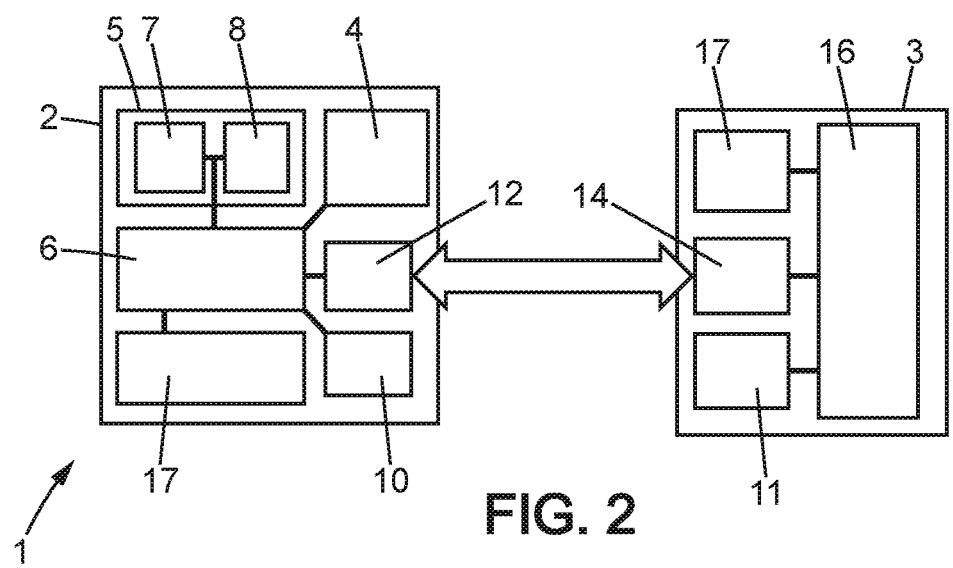
FIG. 2 is a schematic view of the system of FIG. 1.

FIGS. 1 and 2 illustrate a monitored control system 1 according to an embodiment of the invention.

The monitored control system 1 comprises an action device 2 and a monitoring device 3.

A. The Action Device

A.1 Description of the Action Device

The action device 1 comprises a plurality of actuator modules 4 commanded by a respective plurality of command signals, a sensor module 5 to acquire sensor data, and a control module 6.

The control module 6 is able to receive the sensor data and to generate the command signals to command the actuator modules 4 on the basis of the sensor data and a learned value of at least one adjustable control parameter.

The control module 6 is thus a programmable module in which at least one control parameter is adjusted or learned during an action device learning operation 100.

The action device 2 may also comprise a communication module 12, a memory module 17 and an action device learning module 10 that are described in greater details further below.

The sensor module 5 of the action device 2 can comprises several sensors producing sensor data that are used differently within the system.

In particular, the sensor module 5 may comprise an input sensor 7 that acquires input sensor data.

The input sensor data are used by the control module 6 of the action device to generate the plurality of command signals to command the actuator modules 4.

The input sensor 7 can be for instance a bi-dimensional or tri-dimensional sensor such as a camera.

The sensor module 5 may also comprise at least one status sensor 8 to acquire status sensor data.

The status sensor data are used by the monitoring device 3 to computes the action device operation indicator as detailed further below.

The status sensor 8 may be a lower dimensional sensor such as a vibration, noise, temperature, position, orientation or power sensor.

Examples of status sensors 8 are acceleration sensors, encoders, image sensors, distance sensors, infrared sensors, magnetic sensors and torque or current sensors.

Here are more detailed embodiment of each of these examples.

Acceleration sensor: An acceleration sensor may be attached to the action device, for instance to a moving part of the action device, to acquire a value of acceleration during the predefined task as status sensor data.

Encoder: A rotary encoder may be provided on an articulation of the action device, for instance on a drive shaft of a robot arm, to record an amount or speed of rotation during the predefined task as status sensor data.

Image sensor: A camera may be used to acquire an image of the movement of a moving part of the action device during the predefined task, for instance of the robot arm, as status sensor data.

Distance Sensor: A distance sensor may be used to acquire a change of distance of a moving part of the action device, during the predefined task, as status sensor data.

Infrared sensor: An infrared sensor with an IR emitter and a detector may also be arranged so that a IR beam crosses a space where a moving part of the action device is moved. The light blocking pattern of the infrared beam measured during the predefined task may be used as status sensor data.

Magnetic sensor: If a moving part of the action device is made of a metal, a magnetic sensor may be installed so that the movement of the robot can be detected, the value acquired by the magnetic sensor may be used as status sensor data.

Torque sensor, Current sensor: A torque sensor may be provided on a moving part of the action device. The torque sensor may be able to detect a force applied on the robot as status sensor data.

Some of the above described status sensors 8 may also be used as input sensors 7. In general, input sensors 7 and status sensors 8 may be distinct sensors or may be implemented by identical common sensors.

The control module 6 of the action device 2 is able to control the memory module 17 to store sensor data and command signals in the memory module 17.

A.2 Operation in the Action Device

In the example of FIG. 1, the action device 2 is a robot, in particular a robotic arm. However, the invention is not restricted to a robot and can also be any machine of piece of machinery comprising the above mentioned modules, in particular a self-driving car, a machine for chemical manufacturing, a medical device, or any general machinery.

Examples were given above and comprises automated onboard systems such as air conditioning systems for cars or healthcare systems such as blood pressure monitors.

The action device is able and intended to perform a predefined task. The predefined task is performed by the actuator modules 4 when they are commanded by the plurality of command signals.

One possible task, in the above described example of the robotic arm is for instance to recognize a workpiece W by using the sensor data, grasp and lift the workpiece W, move the workpiece to a predetermined position and release the workpiece W.

The operation of the action device comprises two successive phases: a learning phase followed by an operative phase.

During the learning phase, a value of the adjustable control parameter required to perform a predefined task is learned. During the operative phase, said learned value is used to perform the task.

A.2.1 Learning Phase of the Action Device

The learned value of the adjustable control parameter of the action device 2 is determined by an iterative learning procedure during which the action device 2 performs a plurality of task trials with at least two different values of the adjustable control parameter while recording an associated plurality of trial datasets.

Each trial dataset comprises at least the command signals generated to command the actuator modules 4 during each task trial and the associated sensor data acquired by the sensor module 5 while the actuator modules 4 are commanded.

To this aim, the monitored control system 1 may further comprise an action device learning module 10.

The action device learning module 10 communicates with the control module 6 of the action device 2 and is able to set different values of the at least one adjustable control parameter and to command the action device 2 to perform tasks while recording a dataset comprising command signals generated to command the actuator modules during said task and sensor data acquired by the sensor module while the actuator modules are commanded to perform said task.

In particular, the action device learning module 10 is able to command the action device 2 to perform a plurality of predefined task trials with at least two different values of the at least one adjustable control parameter and at least one predefined task with a learned value of the at least one adjustable control parameter.

During said predefined task trials and said predefined task, a plurality of trial datasets and at least one test dataset are respectively recorded by the action device 2, for instance stored in the memory module 17.

A predefined task trial is an attempt at performing a predefined task. Since the value of the adjustable control parameter may not be optimal, a predefined task trial may not be a successful attempt at performing said task. The aim of the action device learning module 10 of the action device learning module 10 is to iteratively determine a satisfactory value for the adjustable control parameter.

If the learning is successful, a predefined task performed with a learned value of the at least one adjustable control parameter is then a test operation during which the action device should be able to performed the predefined task.

The action device learning module 10 is able to determine the learned value of at least one adjustable control parameter of the control module 6 of the action device 2 by an iterative learning procedure on the basis of the plurality of trial datasets.

The action device learning module 10 may for instance use reinforcement learning and/or unsupervised learning algorithm to determine said learned value of at least one adjustable control parameter.

The trial dataset comprise for instance input sensor data acquired by an input sensor 7 of the sensor module 5, status sensor data acquired by a status sensor 8 of the sensor module 5 and command signals generated by the control module 6.

The input sensor data may be used as input to a neural network implemented in the control module 6 of the action device 2 and the command signals may be used as output of said neural network. The adjustable control parameter may be a parameter of said neural network, for instance a weight in said neural network.

The status sensor data may be used to define a reward for a reinforcement learning algorithm.

Figure 3:
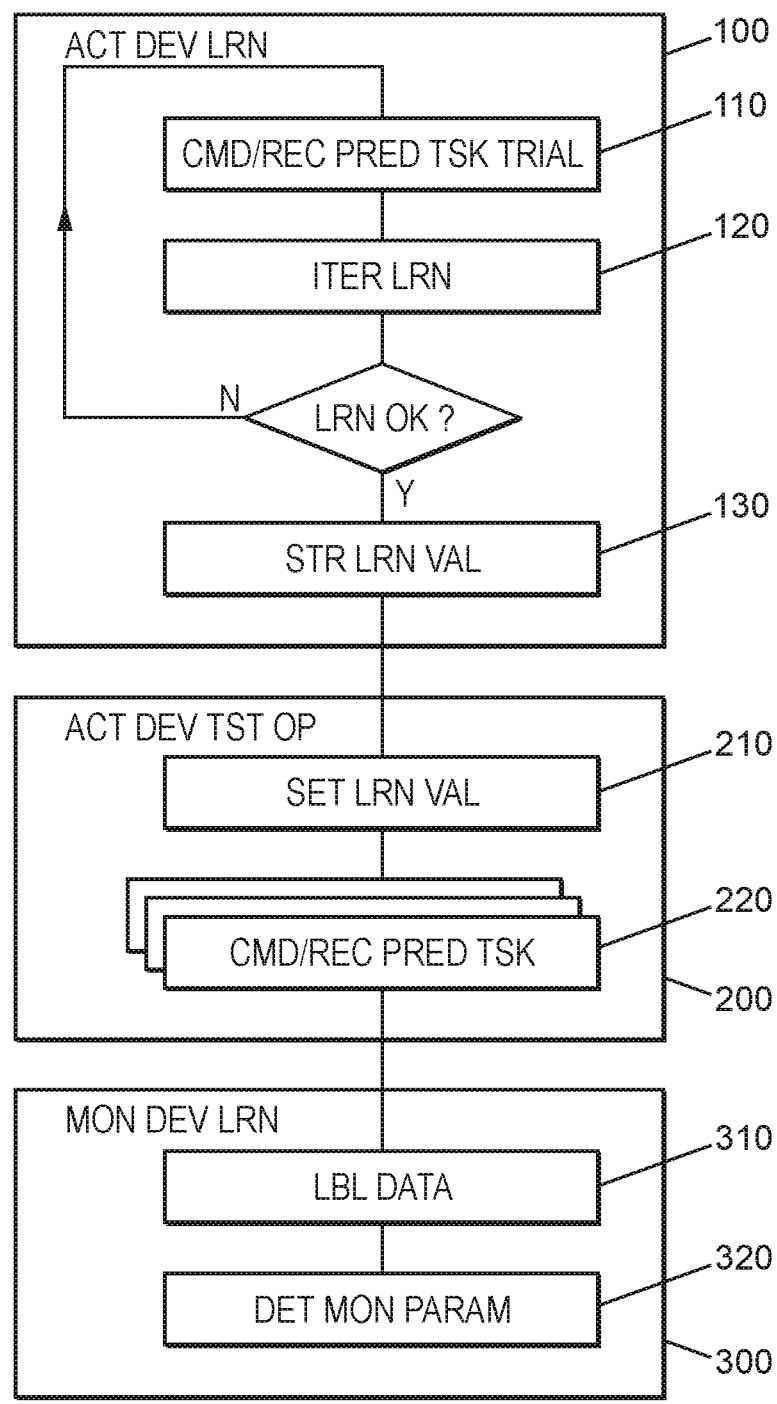
FIG. 3 is a flowchart detailing a method for programming a monitored control system according to an embodiment of the invention.

The action device learning module 10 is thus able to perform an action device learning operation 100 illustrated on FIG. 3 wherein the learned value of at least one adjustable control parameter of the control module of the action device is determined by an iterative learning procedure.

In one embodiment of the invention, during the action device learning operation 100 performed by the action device learning module 10 a learning level indicator is associated to each trial dataset and/or to the test dataset.

The learning level indicator may be indicative of a deviation of the task trial from the predefined task.

For instance the predefined task may comprise at least one target value of the sensor data and the learning level associated to a trial dataset may be function of a difference between a value of the sensor data at the end of the predefined task trial associated to said trial dataset and said target value of the sensor data.

In particular, said at least one target value may be a value of a status sensor data acquired by a status sensor 8 of the sensor module 5.

As a matter of example, the status sensor 8 may be a location sensor detecting a location of an extremity of a robotic arm of the action device 2 and the target value of the status sensor data may be a predefined location of said extremity associated to the predefined task.

The learning level indicator may thus be a value indicative of the improvement of the predefined task trial during the action device learning operation 100.

As a matter of non-limitative example, the learning level indicator may have a integer value between 1 and 9, a value 1 being associated to the earliest, and most random, predefined task trial and a value of 9 being associated to the latest, and closest to the optimal operation, predefined task trial.

In addition, a learning level indicator value of 10 may be associated to the test dataset, indicating optimal operation of the action device 2.

A.2.2 Operative Phase of the Action Device

Once the learning phase has been finished and a value of the adjustable control parameter has been learned, the action device can be operated in an operative phase.

During the operative phase, upon request by a user, an external command system or following a predefined schedule, the action device can perform the predefined task.

The control module then receives the sensor data and generates the command signals to command the actuator modules to perform the predefined task on the basis of the sensor data and the learned value of the at least one adjustable control parameter One possible task, in the above described example of the robotic arm is for instance to recognize a workpiece W by using the sensor data, grasp and lift the workpiece W, move the workpiece to a predetermined position and release the workpiece W.

B. The Monitoring Device

B.1 Description of the Monitoring Device

The monitoring device 3 is illustrated on FIGS. 1 and 2 and comprises at least a communication module 14 and a control module 16.

The communication module 14 of the monitoring device 3 is able to communicate with the communication module 12 of the action device 2 to receive monitored data from the action device 2.

The monitored data comprises at least one among the command signals and the sensor data of the action device 2 during an operation of said predefined task.

The control module 16 of the monitoring device 3 is able to store the monitored data in a memory module 18 of the monitoring device 3 and to compute an action device operation indicator indicative of a correct or abnormal operation of the action device on the basis of said monitored data and at least one learned value of at least one adjustable monitoring parameter.

The monitoring device 3 is thus also a programmable module in which at least one monitoring parameter is adjusted or learned during a monitoring device learning operation 300 that will now be described in greater details.

B.2 Operation in the Monitoring Device

The operation of the monitoring device comprises two successive phases: a learning phase followed by an operative phase.

During the learning phase, a value of the adjustable monitoring parameter required to perform action device monitoring is learned. During the operative phase, said learned value is used to monitor the operation of the action device.

B.2.1 Learning Phase of the Monitoring Device

The learning of the monitoring device 3 is performed after the training of the action device module 2 has been completed The learned value of the adjustable monitoring parameter is determined on the basis of a set of labelled data generated at least in part from the plurality of trial datasets recorded by the action device 2 during the iterative learning procedure of the action device.

In particular, the set of labelled datasets may be generated from the trial datasets of the action device recorded during the iterative learning procedure of the action device 2, and at least one test dataset recorded by setting the at least one adjustable control parameter of the action device 2 to the learned value and commanding the action device 2 to perform at least once the predefined task while recording said at least one test dataset.

In particular, the trial datasets may be labelled with a first label and the at least one test dataset may be labelled with a second label. The learned value of the adjustable monitoring parameter may then be determined by training a classifier to classify respectively the trial datasets with the first label and the test datasets with the second label.

To this aim, the monitoring device 3 further comprises a monitoring device learning module 11.

The learning of the monitoring device 3 is performed by means of the monitoring device learning module 11 and after the training of the action device module 2 has been completed.

The monitoring device learning module 11 uses the dataset recorded during the training of the action device to determine a learned value of the adjustable monitoring parameter of the monitoring device 3.

The communication module 14 of the monitoring device learning 11 receives the plurality of trial datasets and the at least one test dataset recorded during the operation of the action device learning module 10. The datasets can then be stored in the memory module 18 of the action device 3.

The monitoring device learning module 11 then labels the trial datasets with at least a first label "A" and the at least one test dataset with at least a second label "B".

From the labelled datasets, the monitoring device learning module 11 can determine a learned value of at least one adjustable monitoring parameter of the monitoring module 3 by training a classifier to classify respectively the trial datasets with the at least one first label "A" and the test datasets with the at least one second label "B".

By a classifier, it is meant a classification algorithm, for instance a linear classifier (such as Fisher's linear discriminant, Logistic regression, Naive Bayes classifier or a Perceptron), Support vector machines, a Quadratic classifiers, a Kernel estimation such as a k-nearest neighbour, Decision trees such as random forests, Neural networks or Learning vector quantization.

The adjustable monitoring parameter of the monitoring module 3 can in particular be a parameter of the classifier.

The classifier may be learned by using a supervised learning algorithm as known in the prior art.

When a plurality of learning level indicator is associated to each trial dataset, the monitoring device learning module 11 may then labels the trial datasets with a plurality of first labels defined on the basis of the learning level indicator.

For instance, is the learning level indicator is an integer between 1 and 9, the plurality of first labels may comprises nine labels associated to each value of the learning level indicator: A1, A2, . . . , A9.

The learned value of the adjustable monitoring parameter is then determined by the monitoring device learning module 11 by training a classifier to classify respectively the trial datasets and the test datasets respectively with the plurality of first labels and the at least one second label.

As illustrated on FIG. 3, a method for programming a monitored control system 1 according to the invention comprises the following operations.

First, a learned value of at least one adjustable control parameter of the control module 6 of the action device 2 is determined during an action device learning operation 100.

This action device learning operation 100 comprises the sub-operation of commanding 110 the action device 2 to perform a plurality of predefined task trials with at least two different values of said at least one adjustable control parameter while recording an associated plurality of trial datasets. An updated value of the adjustable control parameter can then be determined 120 on the basis of the recorded trial datasets.

The learned value of the adjustable control parameter of the control module 6 is determined by an iterative learning procedure 110, 120 during the action device learning operation 100 and then stored 130 in the control unit 6 of the action device 2.

Then, an action device test operation 200 is performed during which said at least one adjustable control parameter is set 210 to the learned value determined during the action device learning operation 100 and the action device 2 performs 210 at least once the predefined task while recording at least one associated test dataset.

Finally, a monitoring device learning operation 300 is performed wherein a learned value of at least one adjustable monitoring parameter of the monitoring device 3 is determined.

To this aim, the monitoring device learning operation 300 can for instance comprise the sub-operations of labelling 310 the trial datasets with at least a first label and the at least one test dataset with at least a second label, and determining 320 the learned value of at least one adjustable monitoring parameter by training a classifier to classify the trial datasets with the at least one first label and the test datasets with the at least one second label.

As described above, during the action device learning operation 100 a learning level indicator may be associated to each trial dataset and be indicative of a deviation of the task trial from the predefined task. In this case, during the monitoring device learning operation 300 the trial datasets may then be labelled with a plurality of first labels defined on the basis of the learning level indicator. The learned value of the adjustable monitoring parameter can then be determined by training a classifier to classify respectively the trial datasets and the test datasets respectively with the plurality of first labels and the at least one second label.

B.2.2 Operative Phase of the Monitoring Device

Once the learning phase has been finished and a value of the adjustable monitoring parameter has been learned, the monitoring device can be operated in an operative phase.

In the operative phase, the monitoring is able to monitor an operation of the action device 2 and in particular to monitor whether the action device 2 is operating correctly or has deviated from its nominal operation.

To this aim, the monitoring device 3 is able to determine an action device operation indicator indicative of a correct or abnormal operation of the action device. The value of the action device operation indicator can for instance be outputted by the communication module of the monitoring device 3 to alert an operator or to stop the operation of the action device 2 when an abnormal operating state is identified.

In particular, the monitoring device 3 may compute the action device operation indicator by mean of a classifier. The learned value of said at least one adjustable monitoring parameter being a parameter of said classifier.

Such a classifier is in particular as determined during the learning phase described above.

The monitoring device 3 is thus able to monitor the operation of the action device 2. The monitoring device 3 received the status sensor data values from the action device 2 and use the learned classifier to control whether the status sensor data corresponds to a correct operation of the action device (i.e. an operation that is close to the operation of the action device at the end or after the learning operation of the action device) or to an erroneous operation (i.e. an operation corresponding to the beginning of the learning operation of the action device or to status sensor data that were never seen before).

Some examples of operation monitoring are given hereafter.

In the example of automated onboard systems such as air conditioning systems for cars, the status sensor may comprise a temperature sensor.

If the temperature inside the car is measured with a temperature sensor and correspond to a value that has never be recorder before, it can be determined that the operation of the action device is not valid, for example because the operation condition have never been encountered before (very high temperature for instance).

The operation of the action device may thus be stopped or an indicator that the operation is outside the controlled range of operation may be outputted.

The same may be used for a healthcare system, for instance a blood pressure monitor.

The air pressure inside the air cuff of the blood pressure monitor may be recorder with a pressure sensor to constitute status sensor data. If, for example, a deviation is detected by the classifier of the monitoring device 3 between the value of the status sensor data and the value learned during the training of the monitored device, it may be determined that the proper operation of the blood pressure monitor is not guarantee.

The operation of the action device may thus be stopped or an indicator that the operation is outside the controlled range of operation may be outputted.

In these example, the input sensor 7 used for training and operating the action device 2 may be identical to the status sensor 8 used for training and operating the monitoring device 3.

However, in other embodiments, the input sensors 7 and status sensors 8 may be distinct.

The invention claimed is:

1. A monitoring device for monitoring an operation of an action device, the action device comprising:
   a plurality of actuator modules respectively configured to be commanded by a plurality of respective command signals;

at least one sensor module configured to acquire sensor data;

a communication module; and a control module configured to receive the sensor data and to generate a plurality of command signals to command the actuator modules to perform a predefined task, the monitoring device comprising:

a communication module configured to communicate with the communication module of the action device to receive monitored data from the action device, the monitored data comprising at least one of the command signals and the sensor data; and a control module configured to compute an action device operation indicator indicative of a correct or abnormal operation of the action device based on the monitored data and at least one learned value of at least one adjustable monitoring parameter, wherein:

the learned value of the at least one adjustable monitoring parameter is determined based on a set of labelled data generated at least in part from a plurality of trial datasets recorded by the action device during an iterative learning procedure;

the monitoring device further comprises a monitoring device learning module configured to:

receive the plurality of trial datasets and at least one test dataset from the action device;

label the trial datasets with at least a first label and the at least one test dataset with at least a second label; and determine the learned value of the at least one adjustable monitoring parameter by training a classifier to respectively classify the plurality of trial datasets with the at least one first label and the at least one test dataset with the at least one second label;

the plurality of command signals is generated based on the sensor data and a learned value of at least one adjustable control parameter, the learned value of the at least one adjustable control parameter being determined by an iterative learning procedure wherein the action device performs a plurality of task trials with at least two different values of the at least one adjustable control parameter while recording an associated plurality of the trial datasets, each trial dataset comprising at least command signals generated to command the actuator modules during a task trial and sensor data acquired by the sensor module while the actuator modules are commanded; and the set of labelled data is generated from:

the trial datasets of the action device recorded during the iterative learning procedure of the action device; and the at least one test dataset, wherein the at least one test dataset is recorded by setting the at least one adjustable control parameter of the action device to the learned value of the at least one adjustable control parameter and commanding the action device to perform, at least once, the predefined task while recording the at least one test dataset.

2. The monitoring device according to claim 1, wherein the control module of the monitoring device computes the action device operation indicator using a classifier, wherein the learned value of the at least one adjustable monitoring parameter is a parameter of the classifier.

3. A monitored control system comprising:
the monitoring device according to claim 1; and
the action device, comprising:

the plurality of actuator modules respectively configured to be commanded by the plurality of respective command signals;

the at least one sensor module configured to acquire capable of acquiring the sensor data;

the communication module, and the control module configured to receive the sensor data and to generate the plurality of command signals to command the actuator modules to perform the predefined task.

4. The monitored control system according to claim 3, wherein the sensor module of the action device comprises:

at least one input sensor configured to acquire input sensor data used by the control module of the action device to generate the plurality of command signals; and at least one status sensor configured to acquire status sensor data used by the control module of the monitoring device to compute the action device operation indicator.

5. The monitored control system according to claim 4, wherein the input sensor comprises a bi-dimensional or tri-dimensional sensor such as a camera, and the status sensor comprises a lower dimensional sensor such as a vibration sensor, noise sensor, temperature sensor, position sensor, orientation sensor or power sensor.

6. The monitored control system according to claim 3, further comprising an action device learning module configured to:

command the control module of the action device to perform the plurality of predefined task trials with at least two different values of at least one adjustable control parameter and at least one predefined task with a learned value of the at least one adjustable control parameter, respectively record the plurality of trial datasets and the at least one test dataset, each trial dataset and test dataset comprising command signals generated to command the actuator modules during a respective predefined task trial and predefined task and sensor data acquired by the sensor module while the actuator modules are commanded, and determine a learned value of at least one adjustable control parameter of the control module of the action device by an iterative learning procedure based on the plurality of trial datasets.

7. A method for programming the monitoring device according to claim 1, the method comprising:

a monitoring device learning operation wherein a learned value of at least one adjustable monitoring parameter of the monitoring device is determined by labelling the trial datasets with at least a first label and at least one test dataset with at least a second label; and determining the learned value of at least one adjustable monitoring parameter by training a classifier to classify the trial datasets with the at least one first label and the test datasets with the at least one second label.

8. A method for programming the monitored control system according to claim 3, the method comprising:

an action device learning operation wherein a learned value of at least one adjustable control parameter of the control module of the action device is determined by an iterative learning procedure comprising commanding the action device to perform a plurality of predefined task trials with at least two different values of the at least one adjustable control parameter while recording the plurality of trial datasets, each trial dataset comprising command signals generated to command the actuator modules during a predefined task trial and sensor data acquired by the sensor module while the actuator modules are commanded;

an action device test operation wherein at least one test dataset is recorded by:

setting the at least one adjustable control parameter to the learned value determined during the action device learning operation; and commanding the action device to perform, at least once, the predefined task while recording the least one test dataset, the at least one test dataset comprising command signals generated to command the actuator modules during said predefined task and sensor data acquired by the sensor module while the actuator modules are commanded; and performing a method for programming the monitoring device.

9. The method according to claim 8, wherein during the action device learning operation, the learning level indicator is associated with each trial dataset and is indicative of the deviation of the task trial from the predefined task; and during the monitoring device learning operation:

the trial datasets are labelled with a plurality of first labels defined on the basis of the learning level indicator; and the learned value of the adjustable monitoring parameter is determined by training a classifier to respectively classify the trial datasets and the test datasets with the plurality of first labels and the at least one second label.

10. The method according to claim 9, wherein:

the predefined task comprises at least one target value of the sensor data;

the learning level associated with the trial dataset comprises a function of a difference between a value of the sensor data at the end of the predefined task trial associated with the trial dataset and the target value of the sensor data; and the sensor module of the action device comprises at least one input sensor to acquire input sensor data, and at least one status sensor to acquire status sensor data, wherein the control module of the action device generates the plurality of command signals based on the input sensor data and the at least one adjustable control parameter, and wherein the predefined task comprises at least one target value of the status sensor data.

11. The method according to claim 10, wherein:

the action device learning operation involves a reinforcement learning or an unsupervised learning algorithm; and the monitoring device learning operation involves a supervised learning algorithm.

12. A non-transitory computer readable storage medium storing a computer program comprising program instructions, the computer program being loadable into a monitoring device learning module of the monitoring device and adapted to, when read and executed, cause the monitoring device learning module to perform operations comprising the method according to claim 7 in response to the computer program being run by the monitoring device learning module.

* * * * *